(12) United States Patent
Dolan et al.

(10) Patent No.: US 11,567,214 B2
(45) Date of Patent: Jan. 31, 2023

(54) DECODING POSITION INFORMATION

(71) Applicant: Aireon LLC, McLean, VA (US)

(72) Inventors: John Dolan, Chantilly, VA (US); Michael A. Garcia, Ashburn, VA (US)

(73) Assignee: AIREON LLC, McLean, VA (US)

(*) Notice: Subject to any disclaimer, the term of this patent is extended or adjusted under 35 U.S.C. 154(b) by 507 days.

(21) Appl. No.: 16/717,289

(22) Filed: Dec. 17, 2019

(65) Prior Publication Data

US 2021/0181355 A1 Jun. 17, 2021

(51) Int. Cl.
*G01S 19/07* (2010.01)
*H04W 4/029* (2018.01)
(Continued)

(52) U.S. Cl.
CPC ............ *G01S 19/07* (2013.01); *G01S 19/115* (2019.08); *G08G 5/0013* (2013.01);
(Continued)

(58) Field of Classification Search
CPC ...... G01S 5/0027; G01S 11/026; G01S 19/03; G01S 19/07; G01S 19/115; G06F 17/11;
(Continued)

(56) References Cited

U.S. PATENT DOCUMENTS 7,570,214 B2 * 8/2009 Smith ............... G01S 13/78
342/451

8,072,382 B2 * 12/2011 Smith ............... G01S 11/02
342/357.31
(Continued)

FOREIGN PATENT DOCUMENTS

AU 2020256390 A1 * 7/2021 ............. G01S 19/07
AU 2020256390 B2 * 12/2021 ............. G01S 19/07
(Continued)

OTHER PUBLICATIONS

Australian Government, IP Australia, Examination Report issued in Australian Patent Application No. 2020256390, dated Jun. 28, 2021.
(Continued)

*Primary Examiner* — Eric Nowlin
(74) *Attorney, Agent, or Firm* — Baker Botts L.L.P.

(57) ABSTRACT

In one implementation, first and second messages are received that include encoded position information for a transmitter. It is determined that both were received within some time of a previous message and that the second message was received within some time of the first message. A first location of the transmitter is determined based on the encoded position in the first message and the previously determined location. A second location of the transmitter is determined based on the encoded position in the second message and the previously determined location. It also is determined that the first and second locations are within a threshold distance. An updated second location of the transmitter is determined based on the encoded position information in the second message and the first location. A determination is made that the second location and the updated second location are within a threshold distance.

20 Claims, 7 Drawing Sheets

(51) Int. Cl.
*G01S 19/11* (2010.01)
*G08G 5/00* (2006.01)
*H04W 4/021* (2018.01)
*G06F 17/11* (2006.01)

(52) U.S. Cl.
CPC .......... *H04W 4/021* (2013.01); *H04W 4/029* (2018.02); *G06F 17/11* (2013.01)

(58) Field of Classification Search
CPC ... G08G 5/0013; G08G 5/0082; H04W 4/021; H04W 4/029
See application file for complete search history.

(56) References Cited

U.S. PATENT DOCUMENTS

| | | | | |
|---|---|---|---|---|
| 8,521,127 B2* | 8/2013 | Strahs | .................. | H04W 68/02 455/412.2 |
| 8,791,861 B2* | 7/2014 | Garcia | .................. | H04H 20/55 342/464 |
| 8,930,438 B2* | 1/2015 | Williamson | ............ | H04L 67/52 709/203 |
| 8,983,425 B2* | 3/2015 | Strahs | ................... | H04W 4/02 455/412.2 |
| 9,052,375 B2* | 6/2015 | Sampigethaya | ... | H04B 7/18506 |
| 9,218,741 B2* | 12/2015 | Wu | ...................... | G01S 13/876 |
| 9,311,821 B2* | 4/2016 | Melum | .............. | H04B 7/18506 |
| 9,384,667 B2* | 7/2016 | Klang | ................ | G08G 5/0052 |
| 9,426,617 B2* | 8/2016 | Strahs | ................ | H04W 4/18 |
| 9,451,035 B2* | 9/2016 | Williamson | ........ | H04W 4/029 |
| 9,536,435 B1* | 1/2017 | Shay | .................. | G05D 1/0005 |
| 9,544,047 B2* | 1/2017 | Sampigethaya | ..... | G08G 5/0013 |
| 9,569,971 B2* | 2/2017 | Behrens | ................ | H01Q 1/125 |
| 9,609,477 B2* | 3/2017 | Rotstein | .............. | H04W 64/00 |
| 9,877,302 B2* | 1/2018 | Strahs | ................. | H04W 4/029 |
| 9,918,192 B2* | 3/2018 | Rodriguez Montejano | ................ | H04B 7/18506 |
| 10,001,546 B2* | 6/2018 | Gibson | ............... | G08G 5/0013 |
| 10,009,872 B2* | 6/2018 | Lin | ...................... | H04W 4/029 |
| 10,043,401 B2* | 8/2018 | Kathirvel | ............. | G08G 5/0013 |
| 10,089,893 B2* | 10/2018 | Dacre-Wright | ........ | G08G 5/025 |
| 10,144,505 B2* | 12/2018 | Kim | ..................... | G08G 5/0021 |
| 10,192,450 B2* | 1/2019 | Adler | .................... | G08G 5/006 |
| 10,332,405 B2* | 6/2019 | Kopardekar | ......... | G08G 5/0043 |
| 10,506,381 B2* | 12/2019 | Bonanno | .............. | H04W 4/029 |
| 10,795,016 B2* | 10/2020 | Hauswald | ............ | G08G 5/0008 |
| 10,871,574 B2* | 12/2020 | Garcia | ..................... | G01S 5/12 |
| 10,901,093 B2* | 1/2021 | Garcia | ..................... | G01S 5/06 |
| 11,022,696 B1* | 6/2021 | Kacem | .................. | G01S 19/215 |
| 11,094,209 B1* | 8/2021 | Pham | ................... | G08G 5/0078 |
| 11,158,198 B1* | 10/2021 | Beard | .................... | G01S 19/33 |
| 11,197,126 B2* | 12/2021 | Moridi | ................. | H04W 4/021 |
| 11,302,204 B2* | 4/2022 | Hochwarth | ........ | G08G 5/0091 |
| 11,327,179 B2* | 5/2022 | McKeown | ........... | G08G 5/0082 |
| 2004/0032367 A1* | 2/2004 | Smith | .................. | G08G 5/0013 342/456 |
| 2007/0252760 A1* | 11/2007 | Smith | .................. | G01S 11/02 342/451 |
| 2008/0032703 A1* | 2/2008 | Krumm | ................ | H04W 4/029 455/456.1 |
| 2009/0156161 A1* | 6/2009 | Strahs | ................... | H04L 67/52 455/412.2 |
| 2010/0325194 A1* | 12/2010 | Williamson | .......... | H04W 4/029 709/203 |
| 2013/0120183 A1* | 5/2013 | Revol | .................. | G01S 13/781 342/37 |
| 2013/0144518 A1* | 6/2013 | Dacre-Wright | ......... | B64C 19/00 701/121 |
| 2013/0211701 A1* | 8/2013 | Baker | .................. | G08G 5/0026 701/120 |
| 2013/0344843 A1* | 12/2013 | Strahs | .................. | H04W 4/029 455/404.2 |
| 2014/0002293 A1* | 1/2014 | Behrens | ............... | H04B 7/2041 342/36 |
| 2014/0302775 A1* | 10/2014 | Garcia | .................. | H04H 20/55 455/3.06 |
| 2014/0327564 A1* | 11/2014 | Sampigethaya | ... | H04B 7/18506 342/32 |
| 2015/0189472 A1* | 7/2015 | Strahs | .................. | H04W 68/02 455/456.3 |
| 2015/0331099 A1* | 11/2015 | Wu | .......................... | H04K 3/82 342/32 |
| 2016/0086203 A1* | 3/2016 | Dove | ................. | G06Q 30/0203 705/7.32 |
| 2016/0086204 A1* | 3/2016 | Dove | ..................... | H04W 4/029 705/7.32 |
| 2016/0086205 A1* | 3/2016 | Dove | ..................... | H04W 4/029 705/7.32 |
| 2016/0155342 A1* | 6/2016 | Gibson | ............... | G08G 5/0078 701/409 |
| 2016/0309291 A1* | 10/2016 | Rodriguez Montejano | ................ | H04L 43/16 |
| 2016/0343257 A1* | 11/2016 | Kim | ....................... | G08G 5/0034 |
| 2016/0360505 A1* | 12/2016 | Strahs | .................... | H04L 67/52 |
| 2017/0140656 A1* | 5/2017 | Mott | ....................... | G01S 19/03 |
| 2017/0236425 A1* | 8/2017 | Ballestros | .............. | G08G 5/045 342/32 |
| 2017/0337828 A1* | 11/2017 | Kathirvel | ............. | G08G 5/0008 |
| 2018/0061246 A1* | 3/2018 | Adler | .................... | G08G 5/045 |
| 2018/0114452 A1* | 4/2018 | Dacre-Wright | ....... | G05D 1/0005 |
| 2018/0152912 A1* | 5/2018 | Lin | ........................ | H04W 4/023 |
| 2018/0196140 A1 | 7/2018 | Garcia et al. | | |
| 2018/0359609 A1* | 12/2018 | Bonanno | ............... | H04W 4/029 |
| 2019/0304314 A1* | 10/2019 | Hochwarth | .......... | G08G 5/0091 |
| 2020/0084580 A1* | 3/2020 | Labrie | ..................... | G06F 3/165 |
| 2020/0088887 A1* | 3/2020 | Garcia | .................... | G01S 19/23 |
| 2020/0293852 A1* | 9/2020 | Khoche | ........... | G06K 19/06037 |
| 2020/0355832 A1* | 11/2020 | Garcia | ...................... | G01S 5/12 |
| 2021/0035457 A1* | 2/2021 | Pennapareddy | ....... | H04L 9/3239 |
| 2021/0124375 A1* | 4/2021 | Li | .......................... | G08G 5/045 |
| 2021/0168560 A1* | 6/2021 | Moridi | ............... | G06Q 10/1093 |
| 2021/0181355 A1* | 6/2021 | Dolan | .................. | G08G 5/0013 |
| 2021/0255616 A1* | 8/2021 | Surace | .................. | G08G 5/003 |
| 2021/0258733 A1* | 8/2021 | Hapola | ............. | A63B 24/0021 |
| 2022/0101657 A1* | 3/2022 | Lad | ..................... | H04B 17/3911 |
| 2022/0104167 A1* | 3/2022 | Campbell | ............... | H04W 4/42 |
| 2022/0139232 A1* | 5/2022 | Lopez Leones | ..... | G08G 5/0021 340/971 |

FOREIGN PATENT DOCUMENTS

| | | | | |
|---|---|---|---|---|
| CN | 102881188 A | | 1/2013 | |
| CN | 103927905 B | | 2/2017 | |
| EP | 1906204 B1 | * | 12/2009 | .............. G01S 11/02 |
| EP | 3246895 A1 | * | 11/2017 | ........... G08G 5/0008 |
| EP | 3288007 A1 | * | 2/2018 | ........... G08G 5/0026 |
| EP | 3550541 A1 | * | 10/2019 | ........... G01C 23/005 |
| EP | 3573036 A1 | | 11/2019 | |
| EP | 3839549 A1 | * | 6/2021 | .............. G01S 19/07 |
| GB | 2514227 A | * | 11/2014 | ........... G08G 5/0004 |
| WO | WO-2017004047 A1 | * | 1/2017 | ........... G01S 19/426 |

OTHER PUBLICATIONS

European Patent Office, Extended European Search Report issued in European Patent Application No. EP 20203441.9, dated Apr. 9, 2021.

* cited by examiner

Local CPR Decode

1: $Dlat = \dfrac{360°}{60-i}$

2: $j = \text{floor}\left(\dfrac{Lat}{Dlat}\right) + \text{floor}\left(\dfrac{1}{2} + \dfrac{\text{MOD}(lat, Dlat)}{Dlat} - \dfrac{YZ}{2^{17}}\right)$ 3: $Rlat = Dlat \cdot \left(j + \dfrac{YZ}{2^{17}}\right)$ 4: $NL = \text{Longitude Zones}(Rlat)$ 5: if $(NL - i) > 0$ then 6: $\quad Dlon = \dfrac{360°}{NL - i}$ 7: else 8: $\quad Dlon = 360°$ 9: end if 10: $m = \text{floor}\left(\dfrac{Lon}{Dlon}\right) + \text{floor}\left(\dfrac{1}{2} + \dfrac{\text{MOD}(Lon, Dlon)}{Dlon} - \dfrac{XZ}{2^{17}}\right)$ 11: $Rlon = Dlon \cdot \left(m + \dfrac{XZ}{2^{17}}\right)$ 12: return $Rlat, Rlon$

FIG. 3

Longitude Zones

1: if $lat = 0$ (the equator) then
2:    $NL = 59$
3: else if $|lat| = 87$ then
4:    $NL = 2$
5: else if $|lat| > 87$ then
6:    $NL = 1$
7: else
8:    $NL = \text{floor}\left(2\pi \cdot \left[\arccos\left(1 - \dfrac{1 - \cos\left(\frac{\pi}{2 \cdot NZ}\right)}{\cos^2\left(\frac{\pi}{180} \cdot |lat|\right)}\right)\right]^{-1}\right)$
9: end if
10: return $NL$

DECODING POSITION INFORMATION

TECHNICAL FIELD

The disclosure relates generally to decoding position information.

SUMMARY

According to one implementation of the disclosure, first and second messages are received that include encoded position information for a transmitter. It is determined that both were received within some time of a previous message and that the second message was received within some time of the first message. A first location of the transmitter is determined based on the encoded position in the first message and the previously determined location. A second location of the transmitter is determined based on the encoded position in the second message and the previously determined location. It also is determined that the first and second locations are within a threshold distance. An updated second location of the transmitter is determined based on the encoded position information in the second message and the first location. A determination is made that the second location and the updated second location are within a threshold distance.

According to another implementation of the disclosure, a first ADS-B message received by a space-based receiver on at least one satellite is processed, and a second ADS-B message received by a space-based receiver on at least one satellite also is processed. The first ADS-B message comprises CPR-encoded airborne position information for an aircraft at a first time, and the second ADS-B message comprises CPR-encoded airborne position information for the aircraft at a second time. It is determined that both the first ADS-B message and the second ADS-B message were received within a first predetermined period of time of receiving a previous ADS-B message that included previous CPR-encoded position information for the aircraft at a previous time that was decoded to determine a previous location of the aircraft. It also is determined that the second ADS-B message was received within a second predetermined period of time of receiving the first ADS-B message. A first position of the aircraft is decoded from the CPR-encoded airborne position information for the aircraft in the first ADS-B message using the previous position of the aircraft, and a second position of the aircraft is decoded from the CPR-encoded airborne position information for the aircraft in the second ADS-B message using the previous position of the aircraft. A determination is made that the second position of the aircraft is within a predetermined distance of the first position of the aircraft, and an updated second position of the aircraft is decoded from the CPR-encoded airborne position information for the aircraft in the second ADS-B message using the first position of the aircraft. It also is determined that the updated second position of the aircraft is within a second predetermined distance of the second position of the aircraft. As a consequence, the updated second position of the aircraft is identified as a current position of the aircraft.

Other features of the present disclosure will be apparent in view of the following detailed description of the disclosure and the accompanying drawings. Implementations described herein, including the above-described implementations, may include a method or process, a system, or computer-readable program code embodied on computer-readable media.

BRIEF DESCRIPTION OF THE DRAWINGS

For a more complete understanding of the present disclosure, reference now is made to the following description taken in connection with the accompanying drawings.

DETAILED DESCRIPTION

Automatic dependent surveillance-broadcast ("ADS-B")-based systems are being widely adopted for modern flight surveillance technology. In these systems, an aircraft-borne transponder broadcasts periodic messages including position and other information that is received and used for flight surveillance purposes, such as, for example, air traffic control. Different examples of ADS-B-based systems for aircraft surveillance, air traffic control, and flight management systems—including both terrestrial and space-based systems—are described below in connection with FIGS. 5A, 5B, and 6.

ADS-B transponders may transmit position information encoded according to the Compact Position Reporting ("CPR") scheme, and the position information may be encoded in one of two different formats. One format may be used when the aircraft is airborne, while a second format may be used when the aircraft is not airborne but instead is located on the Earth's surface.

Both formats for CPR-encoded position information encode latitude and longitude values into compliant ADS-B position reports. CPR encoding is advantageous in that it may reduce the number of bits required to transmit a given position while maintaining a high position resolution. For example, without CPR encoding, 45 bits may be required to report a given position to within a 5.1 meter resolution (a potentially desirable resolution for airborne position reporting), while 35 bits may be sufficient to report the same position information to within the same resolution using CPR encoding. Thus, at least for airborne position reporting, CPR encoding may save as many as 10 bits for each position report.

CPR-encoded position reports included in ADS-B messages may be transmitted in pairs of messages referred to as "even" and "odd" messages that together constitute a message "pair." Two different techniques may be performed to decode a position from a CPR-encoded position report included in an ADS-B message, which may be referred to as either a global decode or a local decode. The global decode technique may be used when a reference position for the transmitter is unknown or otherwise unavailable, for example, because a previous position of the target is unknown or has timed out (e.g., too much time has elapsed since a previous reference position was determined). The local decode technique may be used when there is a suitable reference position available for the transmitter, for example a previously determined position for the transmitter that was determined within a predefined period of time. The local decoding operation has the benefit relative to the global decoding operation of being able to decode a position for the transmitter based on a single message (along with a valid reference position for the transmitter). By contrast, the global decoding operation takes as input a complete odd/even message pair in order to decode a position for the transmitter. For example, if a valid reference position is not available for a transmitter, the global decode operation may be used to determine a position for the transmitter based on a pair of messages (one odd and one even). Thereafter, a "global reasonableness test" also may be performed in order to confirm the result of the global decode operation. The global reasonableness test itself may take another complete pair of odd/even CPR-encoded position reports in order to confirm the position previously determined by the global decode operation.

Following confirmation of the position determined by the global decode operation, the decoded location then may be used as a reference position that is then subsequently updated based on additional CPR-encoded position reports included in ADS-B messages transmitted by the transmitter using the "local decode" operation. The local decode operation may leverage the previously confirmed reference position to decode the position of the transmitter. The local decode operation does not take as input a complete "pair" of odd and even CPR-encoded position reports but instead may operate with only a single CPR-encoded position report. Because the local decode operation is dependent on previously decoded reference positions being correct, a single incorrectly determined position could cause all subsequent decoded positions to be incorrect. To prevent this from happening, a "local reasonableness test" may be performed to confirm if the result of the local decode operation makes sense. For example, in some implementations, this may involve comparing the new position to the reference position and verifying that the new position is possible assuming a maximum aircraft speed and the time between when the transmitter was located at the reference position and the time of the new CPR-position report. However, the local reasonableness test may break down if that time is too long because the longer the time between the updates the greater the likelihood the aircraft may have maneuvered (e.g., changed direction) in the time between the updates and, therefore, the less likely the local reasonableness test is to be definitive. Thus, in some implementations, the local decode operation only may be performed if the two CPR-encoded position reports corresponding to the reference position and the position to be decoded are received within a relatively short time of each other, such as, for example, 60, 90, or 120 seconds. In such implementations, if more time than that elapses, the global decode operation may be performed in order to reestablish the position of the transmitter, but, as described above, that may involve waiting for receipt of two complete pairs of CPR-encoded position reports.

In areas where there is relatively high probability of detection of ADS-B messages, including CPR-encoded position reports, this approach may result in reliable tracking of an aircraft's airborne position. However, in areas where there is relatively low probability of detection of ADS-B messages, including CPR-encoded position reports, this approach of reverting to the global decode operation after a relatively short gap in messages may be problematic. For example, in areas where there is relatively low probably of detection, longer gaps between messages may be more likely than in regions of higher probability of detection, leading to more global decode operations (e.g., in the event that gaps in between messages exceed 60, 90, or 120 seconds). However, this also may be problematic in regions of relatively low probability of detection because, as discussed above, the global decode operation takes two complete message pairs as inputs, and successfully receiving two complete message pairs in regions of relatively low probability of detection may prove difficult. Thus, the above-described approach to decoding CPR-encoded position reports may lead to difficulty reinitiating the track of an aircraft, resulting in gaps in tracking the position of aircraft, particularly in regions of relatively low probability of detection.

In some implementations of space-based ADS-B systems, a target aircraft's track can be maintained using techniques for decoding CPR-encoded position reports included in ADS-B messages even when gaps between ADS-B messages exceed 60, 90, or 120 seconds or longer, using any two, relatively closely-spaced ADS-B messages including CPR-encoded position reports (e.g., odd/odd, even/even, or odd/even).

Figure 1:
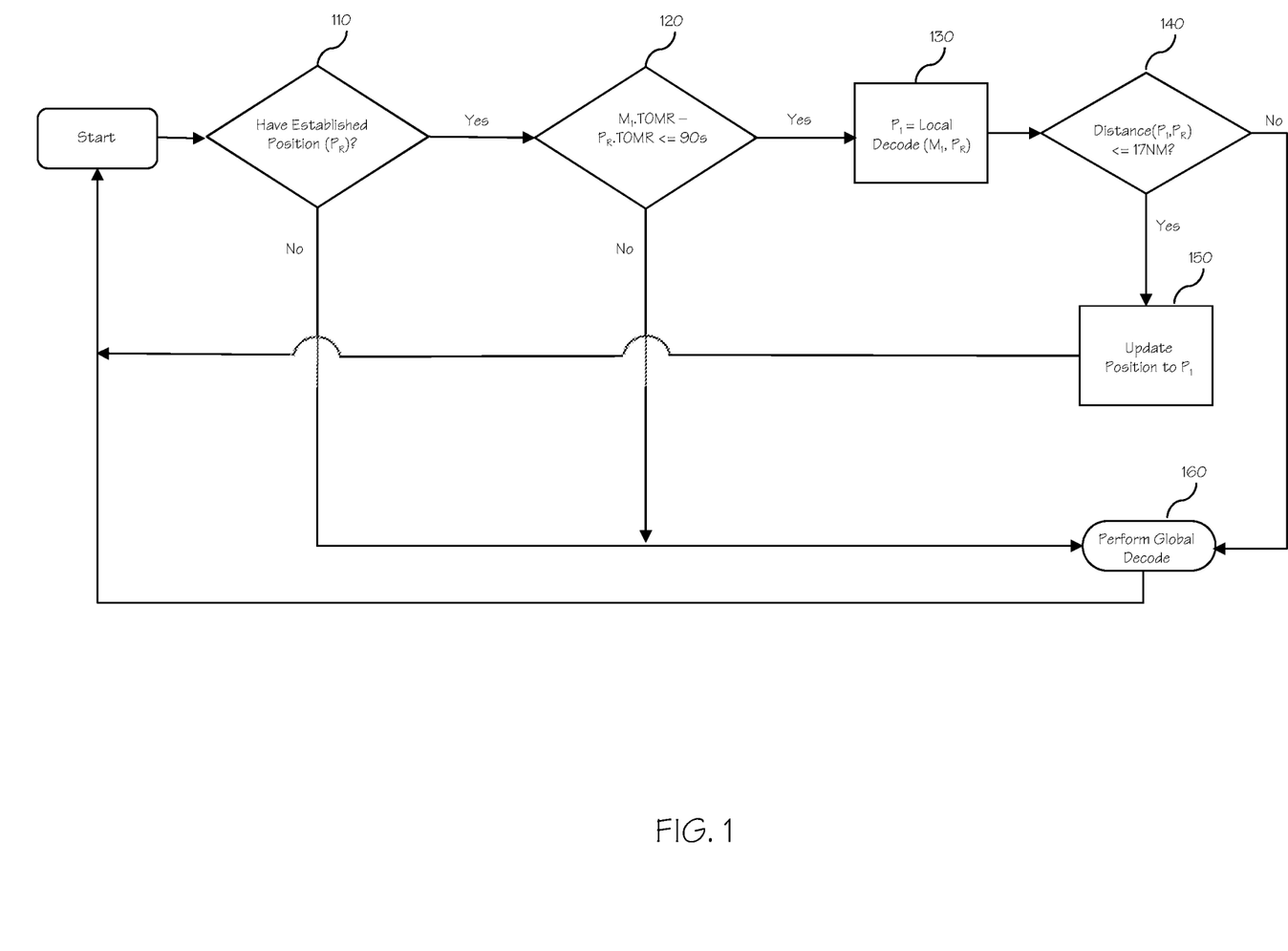
FIG. 1 is a flow chart illustrating an example of a process for decoding CPR-encoded position messages in accordance with a non-limiting implementation of the present disclosure.

FIG. 1 is a flowchart that illustrates an example of the above-described local decode operation for decoding a CPR-encoded position report $M_1$. First, at step 110, the system determines whether a previous position $P_R$ (e.g., a reference position) of a target aircraft has been established, such as, for example, through a previous global decode or local decode with local reasonableness test. If no position $P_R$ has been established for the target aircraft, the system proceeds to step 160 to perform a global decode operation, where, as described above, two complete pairs of CPR-encoded position reports will be taken as inputs. For example, the global decode operation may be performed in accordance with the Minimum Operational Performance Standards (MOPS) for 1090 MHz Extended Squitter Automatic Dependent Surveillance—Broadcast (ADS-B) and Traffic Information Services-Broadcast (TIS-B) (the "DO-260B Supplement") (see, e.g., Appendix A, Section A.1.7; and Appendix T). If a reference position $P_R$ has been established, the system proceeds to step 120, where it is determined whether the time of message reception (TOMR) of the current message $M_1$ (referred to as $M_1$.TOMR) is within a predetermined period of time (e.g., 90 seconds as illustrated in FIG. 1) of the time of message reception of the position $P_R$ ($P_R$.TOMR). If the current message $M_1$ was not received within 90 seconds of the time of message reception for the position $P_R$, then the system proceeds to step 160 to perform a global decode operation. However, if the current message $M_1$ was received within 90 seconds of the time of message reception for the position $P_R$, then the system proceeds to step 130.

At step 130, a local decode operation is performed using the current message $M_1$ and the position $P_R$ to decode the new position $P_1$. For example, the local decode operation may be performed in accordance with the MOPS for 1090 MHz Extended Squitter ADS-B and TIS-B (the "DO-260B Supplement") (see, e.g., Appendix A, Section A.1.7.5) and/or as described further below in connection with FIGS. 3-4. At step 140, a local reasonableness check is performed on the newly decoded position $P_1$ using the position $P_R$. For example, as illustrated in FIG. 1, the local reasonableness check determines if the newly decoded position $P_1$ is within 17 nautical miles of the position $P_R$. If the new position $P_1$ passes the local reasonableness test, then the target aircraft may be considered to be at $P_1$ and the position for the target aircraft may be updated to $P_1$ at step 150. Otherwise, if the new position fails the local reasonableness test, then the system proceeds to step 160 to perform the global decode operation.

As discussed above, however, having to fall back to the global decode operation, for example, because of gaps in between messages or other issues, may be problematic and lead to loss of an aircraft's track, particularly in areas of relatively low probability of detection of ADS-B messages. However, this issue may be mitigated with reference to the processes and techniques for decoding CPR-encoded position reports in a space-based ADS-B system described below. These processes and techniques may address certain limitations associated with decoding CPR-encoded position reports, for example according to approaches specified in the MOPS for 1090 MHz Extended Squitter ADS-B and TIS-B (the "DO-260B Supplement"), which principally focuses on the decoding of CPR-encoded position reports by terrestrial systems. The example processes and techniques described below may incorporate certain aspects of the decoding approaches specified in the DO-260B Supplement, but they modify, supplement, and extend such approaches in a number of ways that yield improvements that address the aforementioned limitations. Those of ordinary skill in the art will appreciate that the techniques described in reference to each process may be implemented in any of a variety of different manners to suit any specific context for space-based ADS-B systems and may not be limited to the specific implementations described herein.

Figure 2:
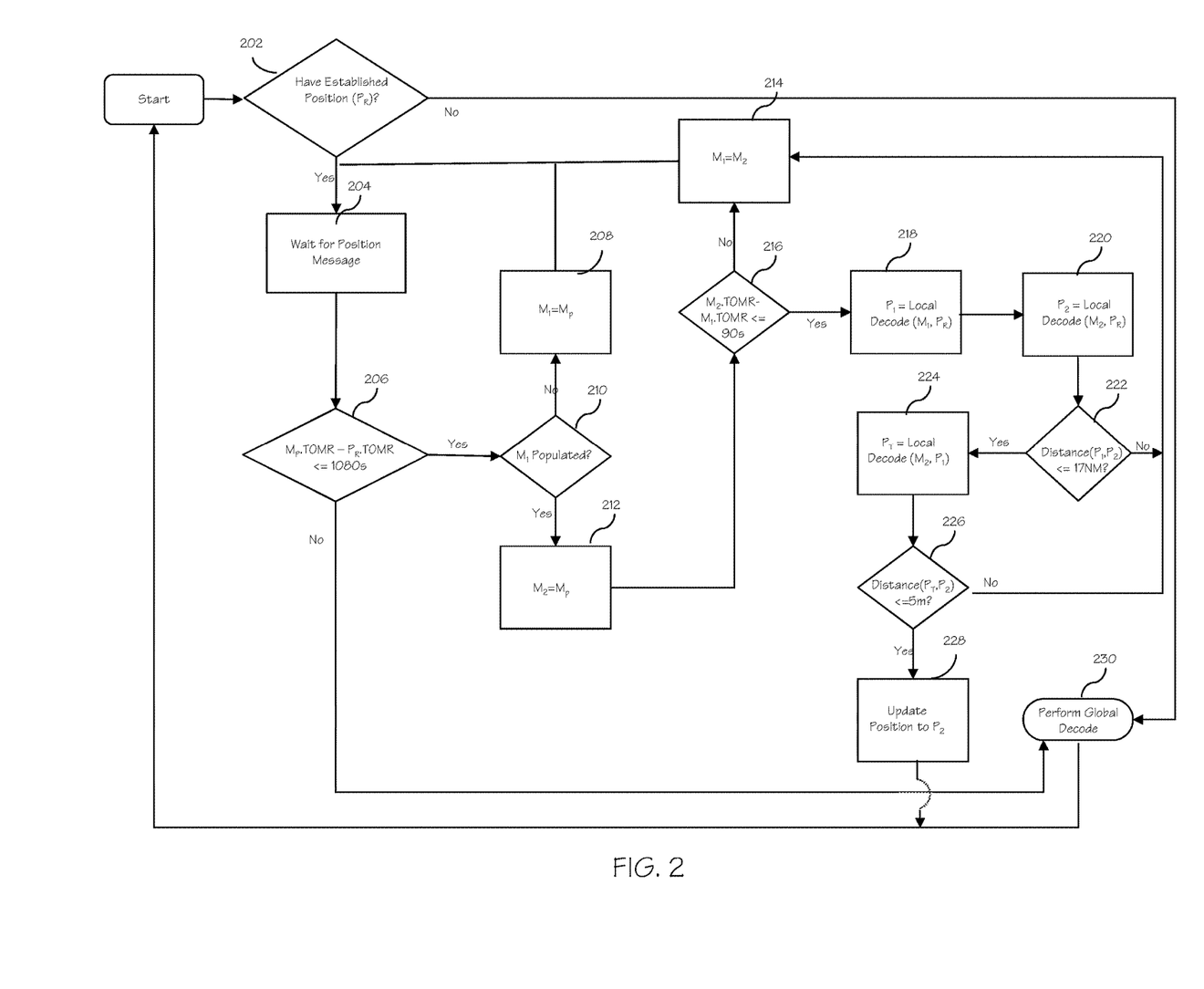
FIG. 2 is a flow chart illustrating an example of process for decoding CPR-encoded position messages in accordance with a non-limiting implementation of the present disclosure.

FIG. 2 is a flow chart that illustrates an example of a process for performing CPR-encoded position report decoding even in the case of extended gaps between messages in accordance with a non-limiting implementation of the present disclosure. A position message $M_P$ is transmitted from a transmitter mounted on a target, such as, for example, an aircraft, and the message $M_P$ is received at a space-based ADS-B receiver. At step 202, a determination is made as to whether a previous position $P_R$ (e.g., a reference position) has been established for the target. For example, the position $P_R$ may have been established for the target through a global decode operation or a local decode operation, for example, according to the process illustrated in FIGS. 3-4. If no reference position $P_R$ has been established for the target, then the process proceeds to step 230 to perform a global decode operation to establish a position for the target. However, if a position $P_R$ already has been established for the target, the process continues to step 204, where it waits for a position message $M_P$. For example, a position message $M_P$ may be transmitted from a transmitter mounted on a target, such as, for example, an aircraft, and the message $M_P$ may be received by a space-based ADS-B receiver. After the position message $M_P$ has been received, the process proceeds to step 206, where a determination is made as to whether the TOMR of the newly received position message $M_P$ is within a predetermined period of time (e.g., 1080 seconds as illustrated in FIG. 2) of the TOMR of the position $P_R$. (The 1080 second time limit illustrated in FIG. 2 is not limiting and is used merely as an example. Other time limits may be used without deviating from the scope of the present disclosure.)

If the TOMR of the position message $M_P$ is not within the predetermined period of time of the TOMR of the position $P_R$, then the process proceeds to 230 to perform a global decode operation. However, if the TOMR of the position message $M_P$ is within the predetermined period of time of the TOMR of the position $P_R$, then the process proceeds to step 210, which determines if $M_1$ is already populated. If it is not, then $M_1$ is set to the newly received position message $M_P$ at step 208, and the process returns to step 204 to wait for another position message. If $M_1$ is already populated at step 210, then $M_2$ is set to the newly received position message $M_P$ at step 212, and the process proceeds to step 216. Step 216 checks whether the messages $M_1$ and $M_2$ were received within a predetermined period of time (e.g., 90 seconds as illustrated in FIG. 2) of each other. If the time between the TOMRs of $M_2$ and $M_1$ is greater than the predetermined period of time, then the process proceeds to step 214, where $M_1$ is set to $M_2$, and then the process returns to step 204 to wait for another position message. However, if the time between the TOMRs of $M_2$ and $M_1$ is less than the predetermined period of time, the process proceeds to step 218.

At step 218, a local decode operation is performed using the message $M_1$ and the position $P_R$, and, at step 220, a local decode operation is performed using the message $M_2$ and the position $P_R$. The output of the local decode operation at step 218 is stored as $P_1$, and the output of the local decode operation at step 220 is stored as $P_2$. At step 222, the process determines whether $P_1$ and $P_2$ are within a predetermined distance (e.g., 17 nautical miles as illustrated in FIG. 2) of each other. This check serves as a reasonableness check on the decoded locations $P_1$ and $P_2$. If the positions decode to values that are farther apart than the predetermined distance, then it may be assumed that there is an error in at least one of the positions. The process, therefore, returns to step 214 and sets $M_1$ to $M_2$, and then returns to step 204 to wait for the next position message $M_P$. However, if the reasonableness check passes at step 222, then the process proceeds to step 224, where a local decode operation is performed on the $M_2$ message using the position $P_1$ obtained from the local decode operation performed on message $M_1$ to obtain a new position for the target $P_T$. The risk of obtaining an erroneous position, therefore, may be decreased, for example, because elements of both messages $M_1$ and $M_2$, which have already been validated by the reasonableness test of step 222, are used as inputs to the local decode operation to obtain position $P_T$. At step 226, an additional reasonableness check is performed on the updated position $P_T$ by checking if $P_T$ is within a predetermined distance (e.g., 5 meters as illustrated in FIG. 2) of the position $P_2$ obtained from performing a local decode operation on message $M_2$ using the previous position $P_R$ at step 220. If this final reasonableness test passes, then the position of the target is updated to the value of $P_2$.

Figure 3:
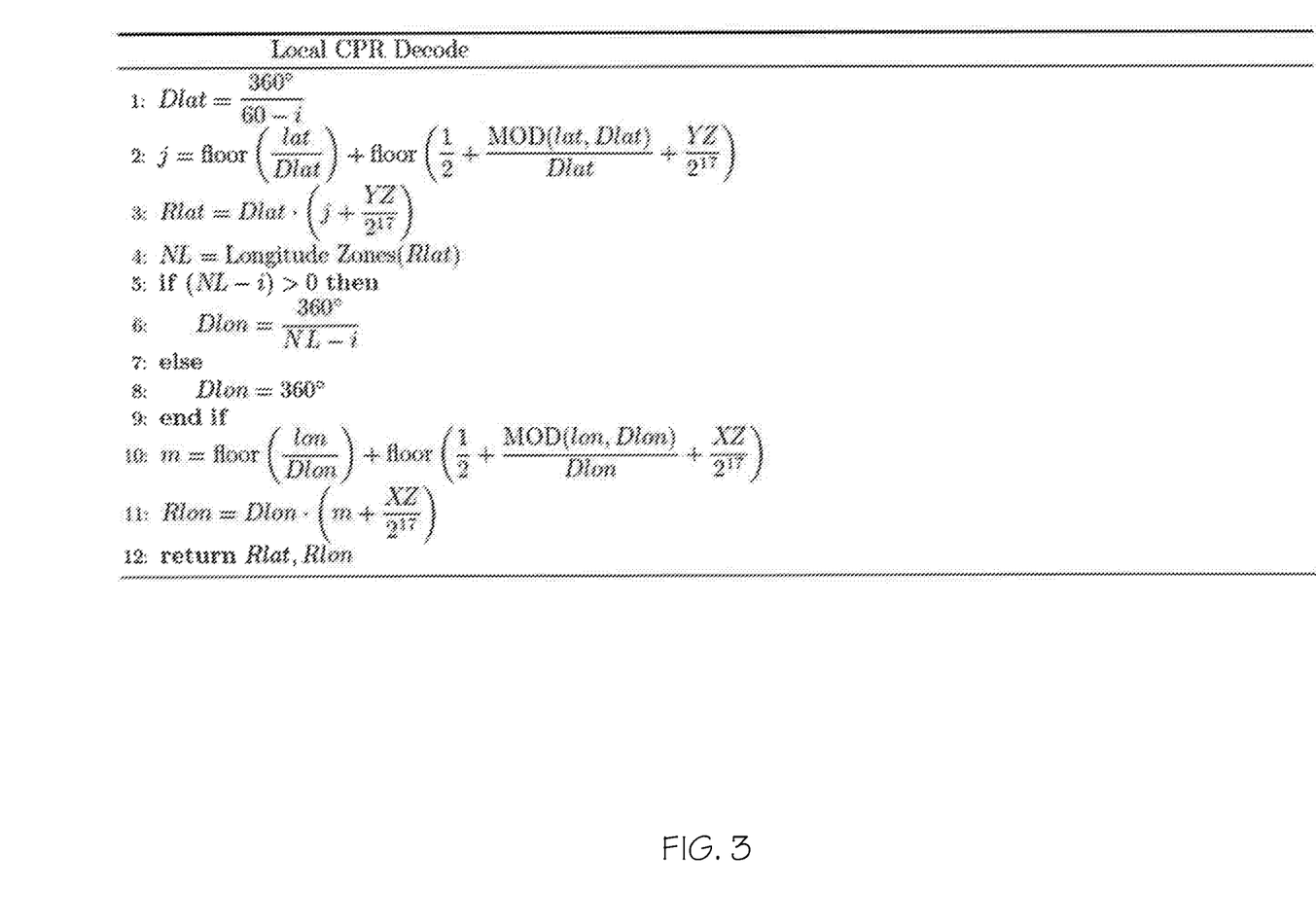
FIGS. 3 and 4 are examples of methods for decoding position information in accordance with a non-limiting implementation of the present disclosure.
Figure 4:
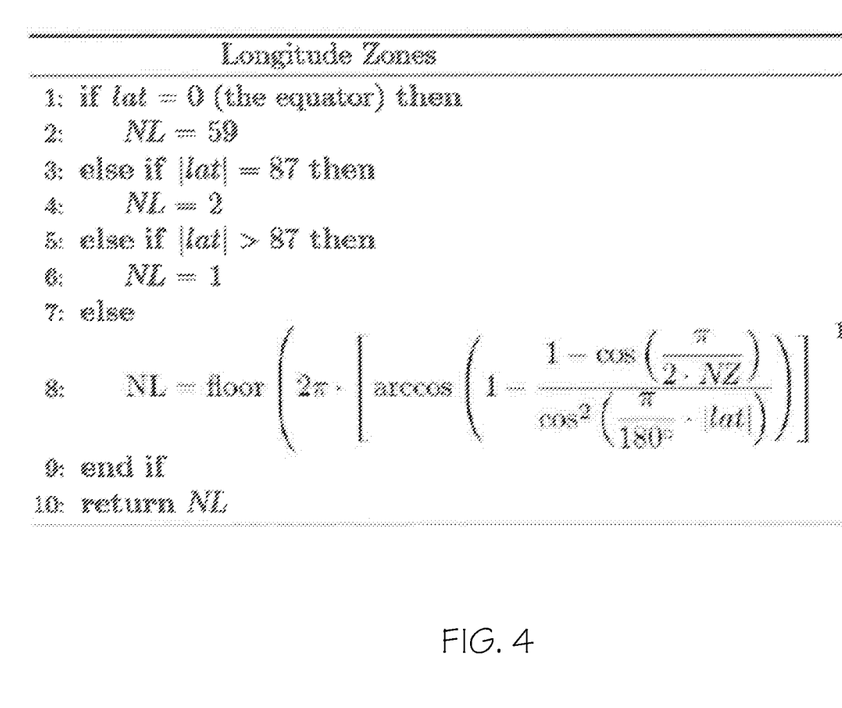

FIGS. 3 and 4 collectively illustrate an example of a process for performing a local decode operation on a CPR-encoded position report received by a space-based ADS-B system. As discussed above, CPR-encoded position reports typically are transmitted as a pair of messages (an even message and an odd message). In FIG. 3, i represents the CPR message format extracted from a CPR-encoded position report, with 0 representing an even message and 1 representing an odd message. In addition, XZ represents the CPR-encoded longitude value extracted from a CPR-encoded position report to be decoded, YZ represents the CPR-encoded latitude value extracted from the CPR-encoded position report to be decoded, lat represents the latitude value for a previously determined reference position, and ion represents the longitude value for the previously determined reference position. The process illustrated in FIGS. 3 and 4 decodes and solves for the latitude and longitude components of the CPR-encoded position report of the target aircraft, which are designated as Rlat and Rlon, respectively.

Lines 1-3 of FIG. 3 illustrate a process for decoding a value of the latitude component of a CPR-encoded position report based on whether the CPR-encoded position report is an odd or even message, the latitude of the reference position lat, and the CPR-encoded latitude value extracted from the CPR-encoded position report YZ. Decoding the longitude component of a CPR-encoded position report involves calculating a number of longitude zones, NL, which is a function of a given latitude (e.g., Rlat). An example of such a process for determining the number of longitude zones is illustrated FIG. 4, and may return values between 1 and 59. Additional information related to determining the number of longitude zones based on the determined latitude may be found in the MOPS for 1090 MHz Extended Squitter ADS-B and TIS-B (the "DO-260B Supplement") (see, e.g., Section A.1.7.2). Lines 5-11 of FIG. 3 illustrate a process for decoding a value of the longitude component of a CPR-encoded position report after the number of longitude zones, NL, has been determined based on the number of longitude zones NL, whether the CPR-encoded position report is an odd or even message, the longitude of the reference position lon, and the CPR-encoded longitude value extracted from the CPR-encoded message XZ.

In particular implementations, the various different processing steps for decoding the latitude and longitude components of a CPR-encoded position report described in connection with FIGS. 1, 2, 3 and 4 can be performed in a variety of different orders. In some implementations, the processing steps may be performed by or in conjunction with a computing apparatus such as, for example, computing apparatus of ground segment 604 of FIG. 5A, computing apparatus of satellite communication network earth terminal 30 and/or air traffic management system 40 of FIG. 6, and/or computing apparatus on board a satellite.

After latitude and longitude values have been successfully decoded from an aircraft's CPR-encoded position report, for example, according to the techniques described herein, the decoded position for the aircraft may be transmitted to one or more appropriate destinations (e.g., subscribing systems that subscribe to position reports or other information for the aircraft), such as, for example, an ANSP or other air traffic control authority, the airline to which the aircraft that transmitted the position report belongs, or any other entity or system that has an interest in the aircraft. For instance, they may be used to track the aircraft's flight track (e.g., on a terminal or display for an air traffic controller).

The techniques for decoding position information in CPR-encoded position reports described herein can be implemented in a variety of different ADS-B-based systems, particularly space-based ADS-B systems. Accordingly, to provide better context for and understanding of the decoding techniques, various examples of such ADS-B systems in which the techniques may be implemented are described below. In a typical ADS-B-based system, an aircraft determines its position using a satellite-based navigation system (e.g., the Global Positioning System ("GPS")) and, as described above, periodically broadcasts its position, thereby enabling the aircraft to be tracked by systems that receive the aircraft's ADS-B broadcasts. In some particular implementations, an ADS-B equipped aircraft uses onboard equipment and sensors to determine its horizontal position, altitude, and velocity and then combines this information with its aircraft identification and call sign into the ADS-B messages that it transmits.

ADS-B-based transponders, which may operate on the same frequency as traditional Mode A/C/S transponders (e.g., 1090 MHz), may utilize different data links and formats for broadcasting ADS-B messages, including, for example, DO-260, DO-260A and DO-260B (Link Versions 0, 1 and 2, respectively) and DO-260B/ED-102A. 1090 MHz Mode S ES is a particular example of one such data link that has been adopted in many jurisdictions. For example, in the United States, the Federal Aviation Administration ("FAA") has mandated 1090 MHz Mode S ES for use by air carrier and private or commercial operators of high-performance aircraft. Like traditional radar-based systems, ADS-B-based systems require appropriate infrastructure for receiving ADS-B messages broadcast by aircraft. As a result, even as numerous jurisdictions transition to terrestrial, ADS-B-based systems, air traffic in vast airspaces remains unmonitored where such infrastructure does not exist.

As described in this disclosure, to address this limitation of terrestrial ADS-B systems (or to supplement terrestrial ADS-B systems), ADS-B receivers may be hosted on satellites and used to receive ADS-B messages broadcast by aircraft. Such ABS-B messages received by the satellites then can be relayed back down to earth terminals or other terrestrial communications infrastructure for transmission to and use by air traffic control, aircraft surveillance, and flight path management services.

Figure 5A:
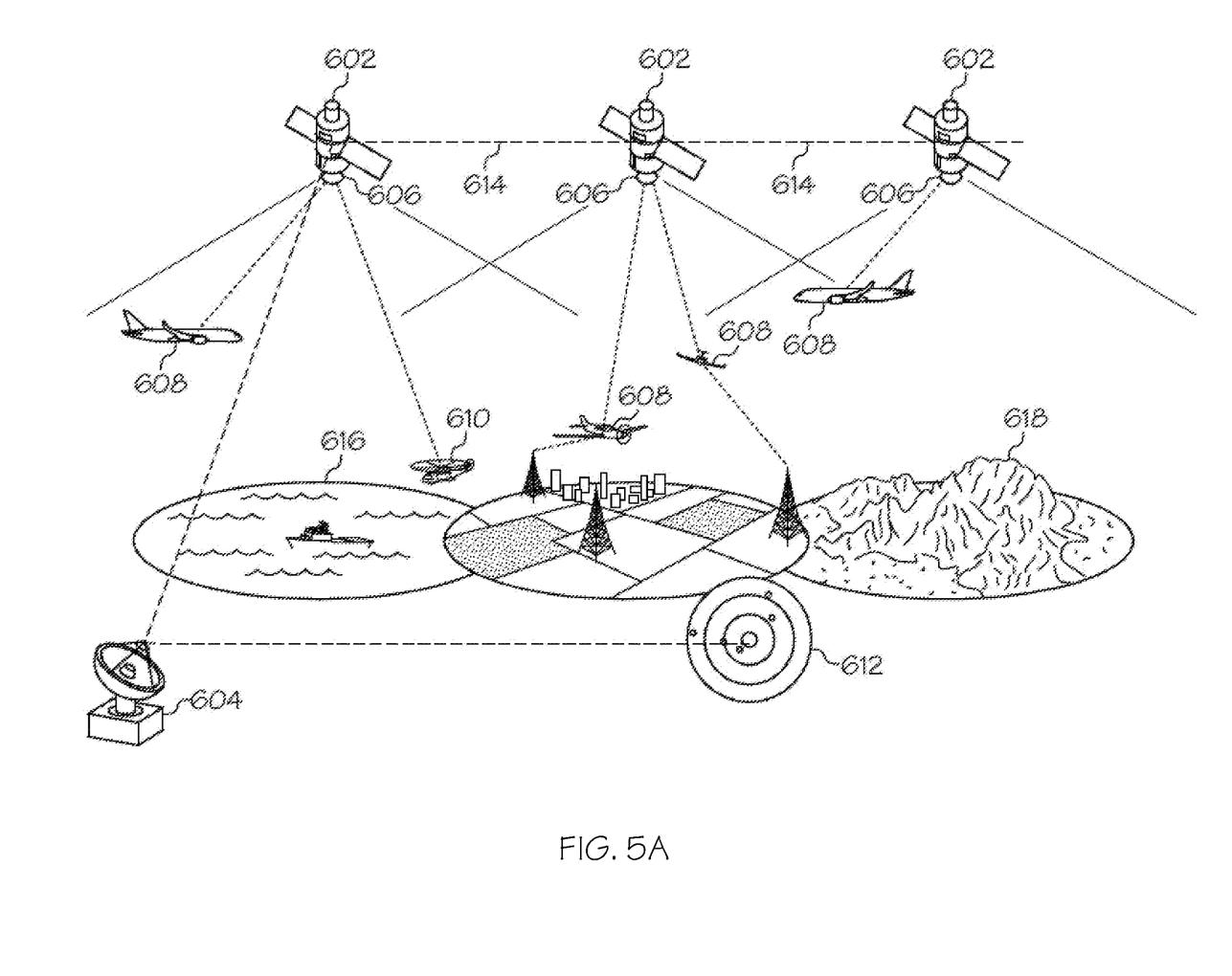
FIGS. 5A and 6 are high-level block diagrams of examples of space-based ADS-B systems in accordance with non-limiting implementations of the present disclosure.

For example, as illustrated in FIG. 5A, a space-based ADS-B system 600 includes one or more satellites 602 in orbit above the Earth and a ground segment 604. Each satellite 602 is equipped with one or more receivers 606 configured to receive ADS-B messages transmitted by aircraft, including, but not limited to, airplanes 608 and helicopters 610, and the ground segment 604, among other things, is configured to communicate with the one or more satellites, including, for example, to receive ADS-B messages that the satellites 602 receive from the aircraft and then relay to the ground segment 604. As illustrated in FIG. 5A, ADS-B messages transmitted by aircraft may be received by terrestrial ADS-B infrastructure, if within range of the aircraft and not obstructed (e.g., by a topographical feature like a mountain or a man-made structure), and/or by ADS-B receivers 606 on board one or more of the satellites 602.

When an ADS-B message transmitted by an aircraft is received by an ADS-B receiver on a satellite 602, the satellite 602 may retransmit the received ADS-B message to the space-based ADS-B system's ground segment 604, for example via a ground station, earth station, earth terminal, teleport, and/or similar terrestrial component configured to communicate with the satellite(s) 602. From there, the space-based ADS-B system's ground segment may route (e.g., via one or more terrestrial communications networks) the ADS-B message (or some or all of the information contained therein) to one or more appropriate destinations 612, such as, for example, an air navigation service provider or other air traffic control authority, the airline to which the aircraft that transmitted the ADS-B message belongs, or any other entity with an interest in the ADS-B message. In some implementations, the information included in the ADS-B message may be combined with ground-based surveillance data and/or flight plan information for integration within air traffic control systems to provide air traffic controllers a single representation of a given aircraft. The space-based ADS-B system's ground segment 604 may transmit the information included in a received ADS-B message to a destination in one of a variety of different formats, including, for example, ASTERIX CAT021, CAT023, CAT025, CAT238 and FAA CAT033 and CAT023.

In some implementations, individual satellites 602 within the space-based ADS-B system 600 may retransmit ADS-B messages that they receive directly to the ground segment 604. Additionally, or alternatively, and as illustrated in FIG. 5A, in some implementations, communications crosslinks 614 may be established between two or more satellites 602 within the space-based ADS-B system 600, thereby enabling the satellites 602 to communicate with one another. In such implementations, a satellite 602 that receives an ADS-B message may retransmit the ADS-B message to the ground segment 604 indirectly through one or more additional satellites 602 within the space-based ADS-B system 600 via the communications crosslinks 614.

Notably, as illustrated in FIG. 5A, ADS-B messages transmitted by aircraft flying over regions where terrestrial ADS-B infrastructure does not exist, for example over oceans 616 or rugged or remote terrain like the poles or mountain ranges 618, may be received by ADS-B receivers 614 on board one or more of the satellites 602. As a result, tracking, monitoring, and/or surveilling aircraft flying over these regions still may be possible even in the absence of terrestrial ADS-B infrastructure in these regions. Space-based ADS-B systems may provide a number of additional advantages as well. For example, traditional radar-based air traffic control systems may be limited in their ability to service high-traffic environments, such as, for example, at or near airports. In contrast, space-based ADS-B systems may provide better service at or near airports and in high traffic areas, thereby enabling, for example, more efficient ground control and flight takeoff and landing schedules and more flexible aircraft maneuvers in congested environments. Additionally, or alternatively, a space-based ADS-B system that provides global ADS-B coverage may enable an airline to have up-to-date and real-time or near real-time visibility of its entire fleet of aircraft at any given moment.

Figure 5B:
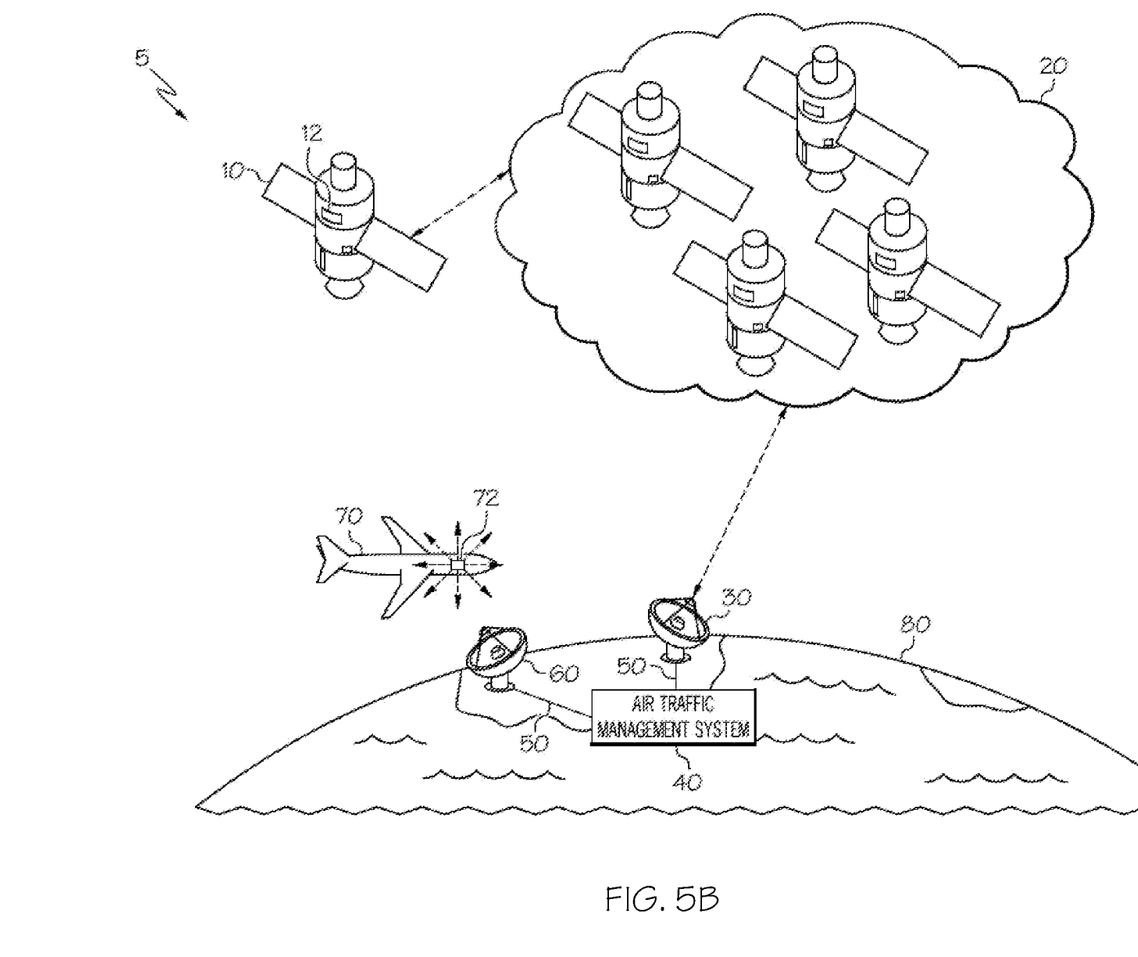
FIG. 5B is a high-level block diagram of an example of an air traffic management system ecosystem in accordance with a non-limiting implementation of the present disclosure.

FIG. 5B is a high-level block diagram that provides another illustration of an example of a space-based ADS-B system 5. As illustrated in FIG. 5B, system 5 includes satellite 10 in communication with and part of satellite network 20, and aircraft 70. In some implementations, satellite network 20, including satellite 10, may be a low-Earth orbit ("LEO") constellation of cross-linked communications satellites. As illustrated in FIG. 5B, terrestrial ADS-B ground station 60, air traffic management system 40 and satellite communication network earth terminal 30 are located on Earth 80's surface.

Aircraft 70 carries an on-board ADS-B transponder 72 that broadcasts ADS-B messages containing flight status and tracking information. Satellite 10 carries payload 12 to receive ABS-B messages broadcast by aircraft 70 and other aircraft. In some implementations, multiple or all of the satellites in satellite network 20 may carry ADS-B payloads to receive ADS-B messages broadcast by aircraft. Messages received at receiver 12 are relayed through satellite network 20 to satellite communication network Earth terminal 30 and ultimately to air traffic management system 40 through terrestrial network 50. The air traffic management system 40 may receive aircraft status information from various aircraft and provide additional services such as ground and/or air traffic control and scheduling or pass appropriate information along to other systems or entities.

In some implementations, ADS-B payload 12 may have one or more antennas and one or more receivers for receiving ADS-B messages broadcast by aircraft. Additionally, or alternatively, in some implementations, ADS-B payload 12 may have a phased array antenna formed from multiple antenna elements that collectively are configured to provide multiple different beams for receiving ADS-B messages.

Terrestrial ADS-B ground station 60 provides aircraft surveillance coverage for a relatively small portion of airspace, for example, limited to aircraft within line of sight of ground station 60. Even if terrestrial ADS-B ground stations like ground station 60 are widely dispersed across land regions, large swaths of airspace (e.g., over the oceans) will remain uncovered. Meanwhile, a spaced-based ADS-B system 5 utilizing a satellite network like satellite network 20 may provide coverage of airspace over both land and sea regions without being limited to areas where ground-based surveillance infrastructure has been installed. Thus, a space-based ADS-B system may be preferable (or a valuable supplement) to terrestrial approaches.

Figure 6:
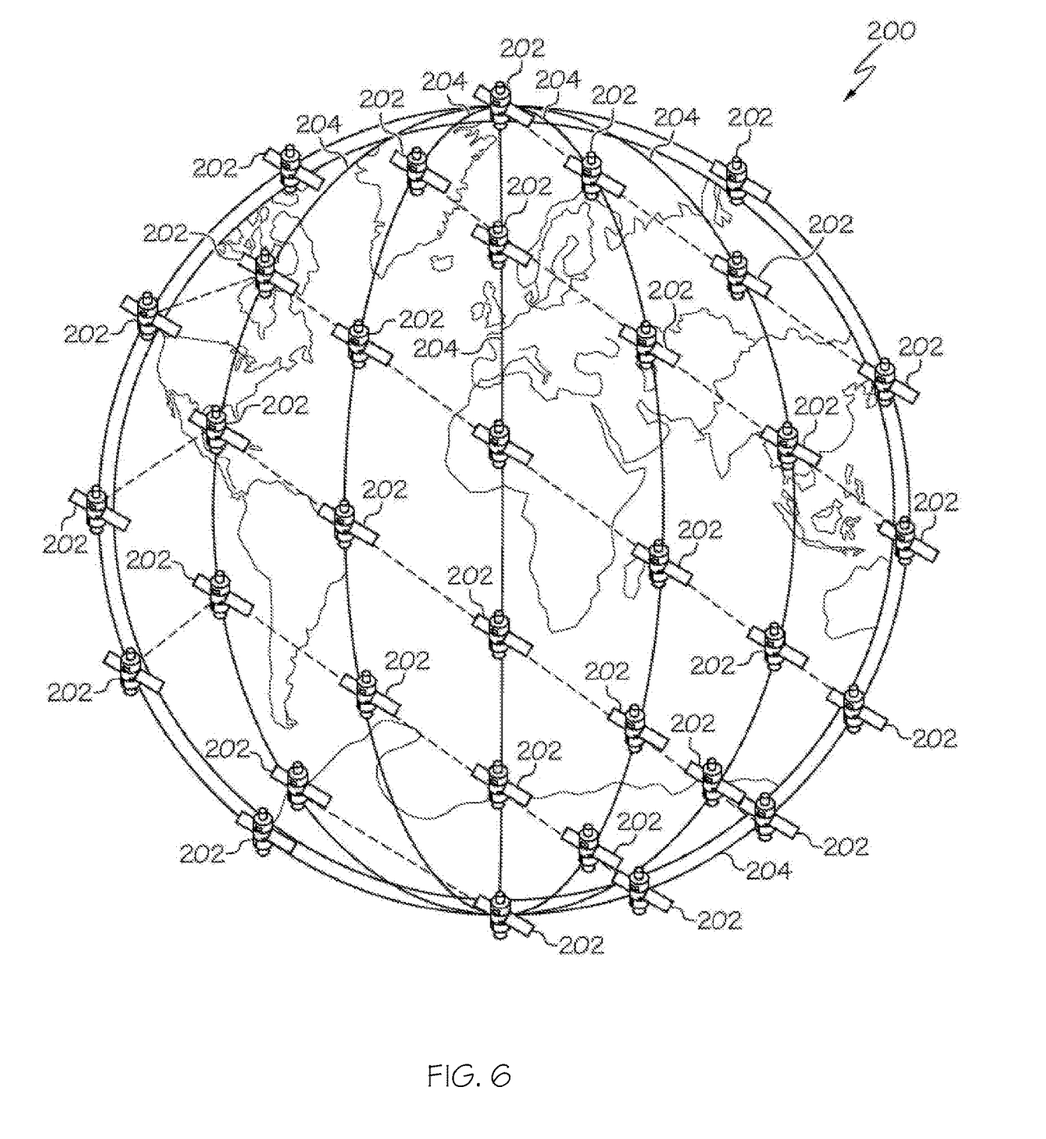

As described above, in some implementations, a space-based ADS-B system may include a constellation of multiple satellites equipped with one or more ADS-B receivers in low-Earth orbit ("LEO") (e.g., 99-1,200 miles above the Earth's surface). For example, as illustrated in FIG. 6, in one particular implementation, a space-based ADS-B system 200 may include 66 LEO satellites 202 equipped with one or more ADS-B receivers (not shown) arranged in 6 orbital planes 204 (e.g., in substantially polar orbits) of 11 satellites each. In this arrangement, the satellites 202 collectively may provide global (or substantially global) ADS-B coverage. For example, the individual satellites 202 of the constellation may have ADS-B coverage footprints that collectively are capable of covering every square inch (or nearly every square inch) of the Earth's surface. As further illustrated in FIG. 6 and as also discussed above in connection with FIGS. 5A and 5B, in some implementations, communications cross-links may be established between individual satellites 202, thereby effectively forming a wireless mesh network in space that may enable the satellites 202 to communicate with each other and to relay ADS-B messages received by individual satellites 202 through the network. In the particular implementation illustrated in FIG. 6, each satellite is cross-linked to four satellites 202: one satellite 202 in each of the fore and aft direction of its orbital 204 plane and one satellite 202 in each of the adjacent orbital planes 204 to the left and right. Although the specific implementation illustrated in FIG. 6 is shown as including 66 LEO satellites 202 arranged in 6 orbital planes 204 (e.g., in substantially polar orbits) of 11 satellites 202 each, space-based ADS-B systems may include different numbers of satellites 202 (e.g., more or less than 66), arranged in different plane configurations (e.g., in different numbers of planes and/or in planes having different inclinations), and in different orbits (e.g., mid-Earth orbit ("MEO"), geostationary orbit ("GEO"), geosynchronous, and/or sun synchronous).

The techniques for decoding position information described herein have been described generally in the context of decoding position information for aircraft. However, they can be applied more generally to decode position information for any type of vehicle or transponder that transmits such position information.

Aspects of the present disclosure may be implemented entirely in hardware, entirely in software (including firmware, resident software, micro-code, etc.) or in combinations of software and hardware that may all generally be referred to herein as a "circuit," "module," "component," or "system." Furthermore, aspects of the present disclosure may take the form of a computer program product embodied in one or more machine-readable media having machine-readable program code embodied thereon.

Any combination of one or more machine-readable media may be utilized. The machine-readable media may be a machine-readable signal medium or a machine-readable storage medium. A machine-readable storage medium may be, for example, but not limited to, an electronic, magnetic, optical, electromagnetic, or semiconductor system, apparatus, or device, or any suitable combination of the foregoing. More specific examples (a non-exhaustive list) of such a machine-readable storage medium include the following: a hard disk, a random access memory (RAM), a read-only memory (ROM), an erasable programmable read-only memory (EPROM or Flash memory), an appropriate optical fiber with a repeater, an optical storage device, a magnetic storage device, or any suitable combination of the foregoing. In the context of this document, a machine-readable storage medium may be any tangible medium that can contain or store a program for use by or in connection with an instruction execution system, apparatus, or device, such as, for example, a microprocessor.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device. Program code embodied on a machine-readable signal medium may be transmitted using any appropriate medium, including but not limited to wireless, wireline, optical fiber cable, RF signals, etc., or any suitable combination of the foregoing.

Computer program code for carrying out operations for aspects of the present disclosure may be written in any combination of one or more programming languages, including object oriented programming languages, dynamic programming languages, and/or procedural programming languages.

The figures illustrate examples of the architecture, functionality, and operation of possible implementations of systems, methods and computer program products according to various aspects of the present disclosure. In this regard, each step in a process or block in a diagram may represent a module, segment, or portion of code, which comprises one or more executable instructions for implementing the specified logical function(s). It should also be noted that, in some alternative implementations, the process steps may occur out of the order illustrated in the figures. For example, two process steps shown in succession may, in fact, be executed substantially concurrently, or the process steps may sometimes be executed in the reverse order, depending upon the functionality involved. It will also be noted that each process step or block of the block diagrams, and combinations of the process steps or blocks in the block diagrams, can be implemented by special purpose hardware-based systems that perform the specified functions or acts, or combinations of special purpose hardware and machine-readable instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to explain the principles of the disclosure and the practical application, and to enable others of ordinary skill in the art to understand the disclosure with various modifications as are suited to the particular use contemplated.

What is claimed is:

1. A method, comprising:
   receiving, from one or more space-based receivers, both a first message and a second message, the first and second messages having been received by the one or more space-based receivers from, and both the first and second messages comprising encoded position information for, a transmitter of the first and second messages that sent the first and second messages at different times;
   determining that both the first message and the second message were received by the one or more space-based receivers within a first predetermined period of time of a previous message that was used to determine a previous location of the transmitter;
   determining that the second message was received by the one or more space-based receivers within a second predetermined period of time from a time that the first message was received by the one or more space-based receivers, the second predetermined period of time being shorter than the first predetermined period of time;
   determining a first location of the transmitter identified by the encoded position included in the first message based on the previous location of the transmitter;
   determining a second location of the transmitter identified by the encoded position included in the second message based on the previous location of the transmitter;
   determining that the first location and the second location are within a first threshold distance of each other;
   determining an updated second location of the transmitter identified by the encoded position information included in the second message based on the first location of the transmitter;
   determining that the second location of the transmitter and the updated second location of the transmitter are within a second threshold distance of each other; and
   transmitting the updated second location of the transmitter to a subscriber system that subscribes to position reports for the transmitter.

2. The method of claim 1, wherein determining that the first location and the second location are within a first threshold distance of each other comprises determining that the first location and the second location are within 17 nautical miles of each other.

3. The method of claim 1, wherein an encoding applied to the encoded position information abstracts the encoded position information relative to a plurality of regions of the Earth such that the encoded position information corresponds to a position in each region.

4. The method of claim 3, wherein the encoding is based on a compact position reporting ("CPR") encoding scheme.

5. The method of claim 4, wherein the previous location of the transmitter was determined based on a pair of messages comprising the previous message and another message, both the previous message and the other message comprising different encoded position information of the transmitter.

6. The method of claim 1, wherein each of the one or more space-based receivers are hosted on a respective satellite in low-Earth orbit.

7. The method of claim 6, wherein the transmitter is hosted on an aircraft.

8. The method of claim 7, wherein the first and second messages are automatic dependent surveillance-broadcast ("ADS-B") messages transmitted by the transmitter from the aircraft.

9. A non-transitory, computer-readable storage medium storing computer-readable instructions that, when executed by one or more processing elements, cause the processing elements to:
process both a first message and a second message received from one or more space-based receivers, the first and second messages having been received by the one or more space-based receivers from, and both the first and second messages comprising encoded position information for, a transmitter of the first and second messages that sent the first and second messages at different times;
determine that both the first message and the second message were received by the one or more space-based receivers within a first predetermined period of time of a previous message that was used to determine a previous location of the transmitter;
determine that the second message was received by the one or more space-based receivers within a second predetermined period of time from a time that the first message was received by the one or more space-based receivers, the second predetermined period of time being shorter than the first predetermined period of time;
determine a first location of the transmitter identified by the encoded position included in the first message based on the previous location of the transmitter;
determine a second location of the transmitter identified by the encoded position included in the second message based on the previous location of the transmitter;
determine that the first location and the second location are within a first threshold distance of each other;
determine an updated second location of the transmitter identified by the encoded position information included in the second message based on the first location of the transmitter;
determine that the second location of the transmitter and the updated second location of the transmitter are within a second threshold distance of each other; and
transmit the updated second location of the transmitter to a subscriber system that subscribes to position reports for the transmitter.

10. The computer-readable storage medium of claim 9, wherein the instructions that, when executed by the processing elements, cause the processing elements to determine that the first location and the second location are within a first threshold distance of each other comprise instructions that, when executed by the processing elements, cause the processing elements to determine that the first location and the second location are within 17 nautical miles of each other.

11. The computer-readable storage medium of claim 9, wherein an encoding applied to the encoded position information abstracts the encoded position information relative to a plurality of regions of the Earth such that the encoded position information corresponds to a position in each region.

12. The computer-readable storage medium of claim 11, wherein the encoding is based on a compact position reporting ("CPR") encoding scheme.

13. The computer-readable storage medium of claim 12, wherein the previous location of the transmitter was determined based on a pair of messages comprising the previous message and another message, both the previous message and the other message comprising different encoded position information of the transmitter.

14. The computer-readable storage medium of claim 9, wherein each of the one or more space-based receivers are hosted on a respective satellite in low-Earth orbit.

15. The computer-readable storage medium of claim 14, wherein the transmitter is hosted on an aircraft.

16. The computer-readable storage medium of claim 15, wherein the first and second messages are automatic dependent surveillance-broadcast ("ADS-B") messages transmitted by the transmitter from the aircraft.

17. A terrestrial processing center that tracks aircraft positioning using a multi-satellite, satellite constellation, the terrestrial processing center comprising:
one or more processing elements; and
a non-transitory, computer-readable storage medium storing computer-readable instructions that, when executed by the one or more processing elements, cause the terrestrial processing center to:
process a first automatic dependent surveillance-broadcast ("ADS-B") message received by a space-based receiver on at least one of a plurality of satellites, the first ADS-B message including compact position reporting ("CPR") encoded airborne position information for an aircraft at a first time;
process a second ADS-B message received by a space-based receiver on at least one of the satellites, the second ADS-B message including CPR-encoded airborne position information for the aircraft at a second time that is different from the first time;
determine that the first ADS-B message was received within a first predetermined period of time of receiving a previous ADS-B message that included previous CPR-encoded airborne position information for the aircraft at a previous time that was decoded to determine a previous location of the aircraft;
determine that the second ADS-B message was received within the first predetermined period of time of receiving the previous ADS-B message that that included the previous CPR-encoded airborne position information for the aircraft at the previous time that was decoded to determine the previous location of the aircraft;
determine that the second ADS-B message was received within a second predetermined period of time of receiving the first ADS-B message, the second predetermined period of time being shorter than the first predetermined period of time;

as a consequence of having determined that the first and second ADS-B messages were received within the first predetermined period of time of receiving the previous ADS-B message and that the second ADS-B message was received within the second predetermined period of time of receiving the first ADS-B message:
  decoding a first position of the aircraft from the CPR-encoded airborne position information included in the first ADS-B message using the previous position of the aircraft,
  decoding a second position of the aircraft from the CPR-encoded airborne position information included in the second ADS-B message using the previous position of the aircraft,
  determining that the second position of the aircraft is within a predetermined distance of the first position of the aircraft,
  as a consequence of having determined that the second position of the aircraft is within the predetermined distance of the first position of the aircraft, decoding an updated second position of the aircraft from the CPR-encoded airborne position information included in the second ADS-B message using the first position of the aircraft,
  determining that the updated second position of the aircraft is within a second predetermined distance of the second position of the aircraft, the second predetermined distance being shorter than the first predetermined distance,
  as a consequence of having determined that the updated second position of the aircraft is within the second predetermined distance of the second position of the aircraft, identifying the updated second position of the aircraft as a current position of the aircraft, and
  transmitting the updated second position of the aircraft to a subscriber system that subscribes to aircraft position information from the terrestrial processing center.

18. The terrestrial processing center of claim 17, wherein the first predetermined period of time is 1,080 seconds or less.

19. The terrestrial processing center of claim 17, wherein the second predetermined period of time is 90 seconds or less.

20. The terrestrial processing center of claim 17, wherein the first predetermined distance is 17 nautical miles or less and the second predetermined distance is 5 meters or less.

* * * * *